United States Patent Office.

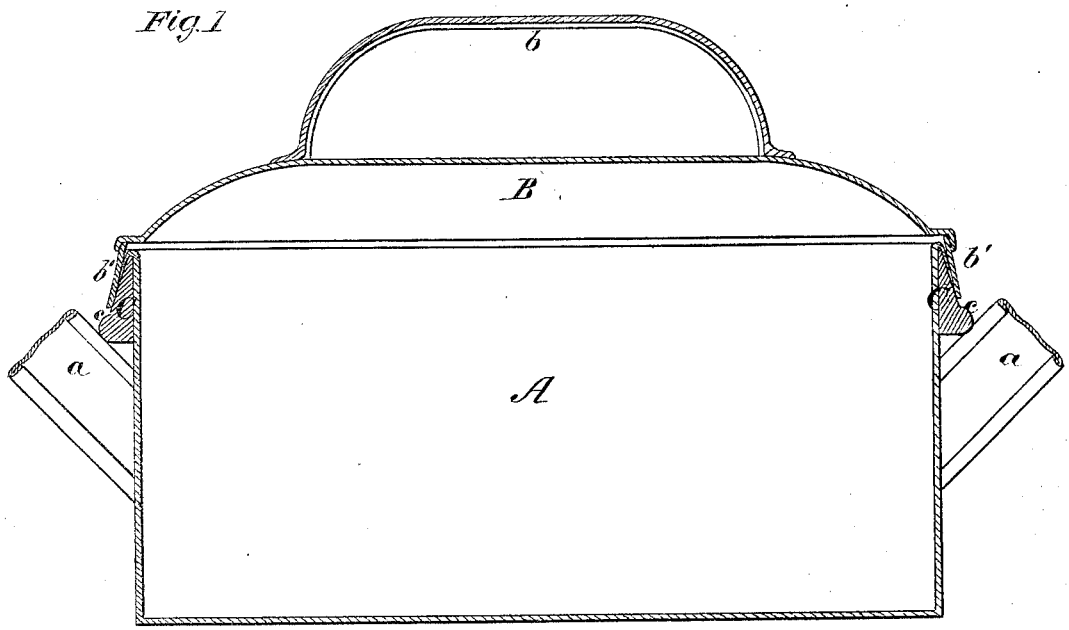
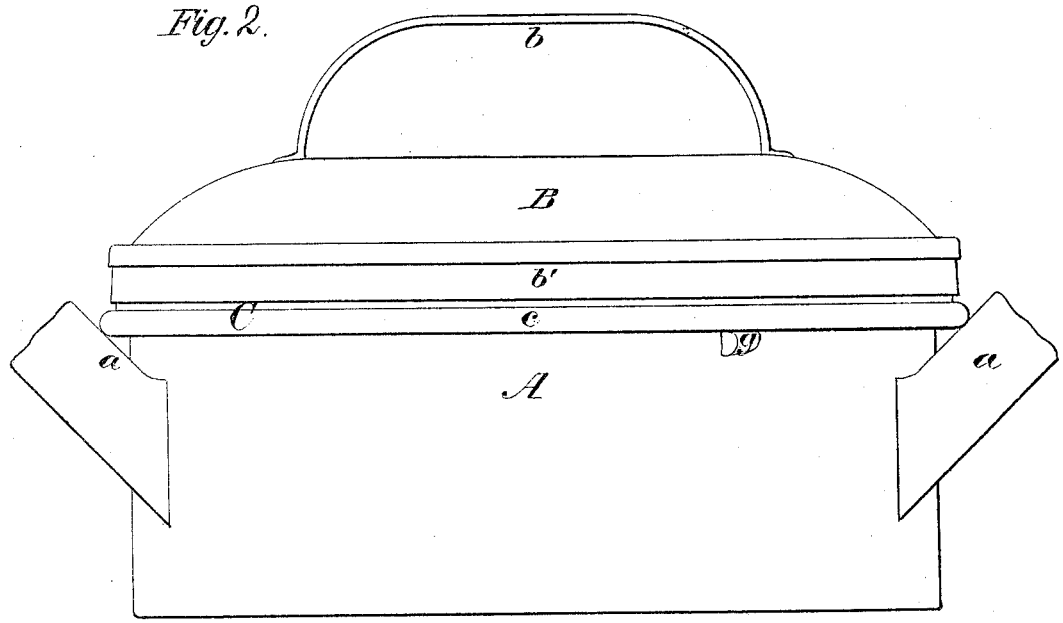

WILLIAM H. BLOOM, OF TIFFIN, OHIO.

Letters Patent No. 113,971, dated April 25, 1871.

---

IMPROVEMENT IN CULINARY VESSELS.

---

The Schedule referred to in these Letters Patent and making part of the same.

---

*To all whom it may concern:*

Be it known that I, WILLIAM H. BLOOM, of Tiffin, in the county of Seneca and State of Ohio, have invented a new and useful Improvement in Culinary Vessels; and I do hereby declare that the following is a full, clear, and exact description thereof, reference being had to the accompanying drawing making part of this specification, in which—

Figure 1 is a diametrical section through a covered vessel having my invention applied to it.

Figure 2 is an elevation of one side of the same vessel.

Similar letters of reference indicate corresponding parts in the two figures.

This invention relates to culinary vessels of all kinds, whether they are provided with covers or not, which are made of thin sheet metal, and which, for this reason, are liable to become bent out of their cylindrical form.

The object of my invention is to improve such vessels by the application to their upper or open ends of a flanged metal ring, of such strength as will stiffen the vessel and preserve the shape originally given to to it, as will be hereinafter explained.

To enable others skilled in the art to understand my invention, I will explain its construction and operation.

In the accompanying drawing—

A represents the body of one form of sheet-metal culinary vessels to which I have applied my invention, and B represents the cover thereof.

The vessel A and its cover B may be made cylindrical, elliptical, or of any other shape.

The body A may or may not be provided with handles *a a*, and the cover B may be provided with a bail or handle, *b*, and an overlapping flange, *b'*.

The nature of my invention consists in applying to the upper edge of the vessel A a flanged ring, C, which may be made of wrought metal, or it may be cast.

This ring C presents an upwardly-tapering or beveled surface externally, terminating below in a head or flange, *c*, which latter affords a "stop" to the flange of the cover B, to prevent this flange from being stretched or spread too much in applying this cover to the vessel. The bead or flange *c* also stiffens the ring.

The stiffening-ring C may be secured in its place around the vessel A by means of solder alone, but I prefer to attach it as represented in the annexed drawing, to wit: by supporting it upon one or more lugs, *g*, which are secured to the vessel externally, and holding it down thereupon by turning over the upper edge of the vessel.

In this way the ring is held fast, and it not only stiffens and preserves the shape of the vessel A, but it also presents a surface, externally, on which the flange *b'* of the cover B may be tightly fitted.

I am aware that sheet-metal vessels have been stiffened before my invention by turning their upper edges over wires. This I do not claim, as the wires thus applied will not afford either the flange-stop *c* nor the beveled surface above described, nor will they afford the stiffness required.

What I claim as my invention, and desire to secure by Letters Patent, is—

The beveled stiffening-ring C applied to a culinary vessel, substantially as described.

WILLIAM H. BLOOM.

Witnesses:
HARRISON NOBLE,
D. K. HUDDLE.